(12) United States Patent
Lee

(10) Patent No.: US 11,218,664 B2
(45) Date of Patent: Jan. 4, 2022

(54) SCALABLE DUAL MODE MONITORING SYSTEM

(71) Applicant: Prime Dragon Limited, Kowloon (HK)

(72) Inventor: Wai Hung Lee, Kennedy Town (HK)

( * ) Notice: Subject to any disclaimer, the term of this patent is extended or adjusted under 35 U.S.C. 154(b) by 0 days.

(21) Appl. No.: 16/820,746

(22) Filed: Mar. 17, 2020

(65) Prior Publication Data

US 2021/0297628 A1 Sep. 23, 2021

(51) Int. Cl.
| | |
|---|---|
| *H04W 76/10* | (2018.01) |
| *H04W 88/06* | (2009.01) |
| *H04B 1/401* | (2015.01) |
| *H04N 7/04* | (2006.01) |
| *H04N 7/18* | (2006.01) |
| *H04W 76/18* | (2018.01) |
| *H04B 1/44* | (2006.01) |

(52) U.S. Cl.
CPC .............. *H04N 7/04* (2013.01); *H04B 1/44* (2013.01); *H04N 7/18* (2013.01); *H04W 76/10* (2018.02); *H04W 76/18* (2018.02); *H04W 88/06* (2013.01)

(58) Field of Classification Search
CPC ..... H04W 76/10; H04W 76/15; H04W 76/18; H04W 84/12; H04W 88/06; H04B 1/40; H04B 1/44; H04B 1/401; H04B 1/50; H04N 7/04; H04N 7/18; H04N 7/20
See application file for complete search history.

(56) References Cited

U.S. PATENT DOCUMENTS

| | | | | |
|---|---|---|---|---|
| 7,610,113 | B2 * | 10/2009 | Cocciadiferro | .... G05B 23/0283 700/108 |
| 8,031,650 | B2 * | 10/2011 | Petite | .................. H04W 72/082 370/320 |
| 9,172,917 | B1 * | 10/2015 | Fu | ............................. H04N 7/18 |
| 9,893,538 | B1 * | 2/2018 | Bell | ......................... H04N 7/18 |
| 10,251,793 | B1 * | 4/2019 | Li | ......................... A61B 5/6892 |

* cited by examiner

*Primary Examiner* — Quochien B Vuong
(74) *Attorney, Agent, or Firm* — Prakash Nama; Global IP Services, PLLC

(57) ABSTRACT

A scalable dual mode monitoring system according to the present invention is configured to communicate using RF communication channels wherever possible for better range and less battery power consumption. When the system uses 2.4 GHz FHSS RF technology, the system coverage could reach a range of 250 meters line of sight; standby current goes down significantly as compared to that of solely using Wi-Fi communication channel; time to get video streaming is reduced when compared to systems that solely use Wi-Fi communication channel because RF communication channels allow for better and faster synchronization; system set-up via RF link is easy without pairing or any setup and requires simply plug and play when using RJ45 cable connecting to router from the hub.

11 Claims, 2 Drawing Sheets

SCALABLE DUAL MODE MONITORING SYSTEM

BACKGROUND OF THE INVENTION

The present invention relates to a monitoring system and more specifically relates to a scalable dual mode monitoring system which switches between RF and Wi-Fi communication modes.

Currently most home camera monitoring systems use Wi-Fi either to connect to a Wi-Fi router or to a hub, or to a gateway which then connects to a Wi-Fi router. These home camera monitoring systems are sometimes used for baby monitor. However, such camera monitoring systems have the following disadvantages: (1) Wi-Fi coverage is in very short range, only about 125 meters for video transmission; (2) The Wi-Fi modules of the cameras wake up regularly, and thus have a high power consumption; (3) It takes a long time to get video streaming because synchronizing the Wi-Fi modules of the cameras with the Wi-Fi router or the hub takes a longer time; (4) It is complicated to set up the system.

BRIEF SUMMARY OF THE INVENTION

In view of the aforesaid disadvantages now present in the prior art, a scalable dual mode monitoring system is provided. The scalable dual mode monitoring system according to the present invention is configured to communicate using RF communication channels wherever possible. When the system uses 2.4 GHz FHSS RF technology, the system coverage could reach a range of 250 meters line of sight; standby current goes down significantly as compared to that of solely using Wi-Fi communication channel; time to get video streaming is reduced when compared to systems that solely use Wi-Fi communication channel because RF communication channels allow for better and faster synchronization; system setup via RF link/communication is easy without pairing or any setup and requires simply plug and play.

A scalable dual mode monitoring system comprising
at least one dual-mode monitoring unit which comprises a dual-mode monitoring unit RF transceiver and a dual-mode monitoring unit Wi-Fi transceiver;
a hub which connects to a Wi-Fi router and comprises one or more processors, a hub Wi-Fi transceiver and a hub RF transceiver unit which provides a plurality of RF communication channels for communicating between the hub RF transceiver unit and the dual-mode monitoring unit RF transceiver of the dual-mode monitoring unit;
the hub further comprises memory storing instructions that, when executed by the one or more processors when communication between the hub and any one of the at least one dual-mode monitoring unit is required to be established, cause the hub to:
determine if all the RF communication channels are occupied;
if not all the RF communications channels are occupied, configure the hub RF transceiver unit to communicate with the dual-mode monitoring unit RF transceiver of the dual-mode monitoring unit which is required to establish communication with the hub via one of the RF communication channels;
if all the RF communication channels are occupied, configure the hub to select, among the dual-mode monitoring unit(s) which is/are in communication with the hub and the dual-mode monitoring unit which is required to establish communication with the hub, a dual-mode monitoring unit which is within a particular range possible for communication between the dual-mode monitoring unit Wi-Fi transceiver thereof and the hub Wi-Fi transceiver; and then configure the hub Wi-Fi transceiver to communicate with the dual-mode monitoring unit Wi-Fi transceiver of the selected dual-mode monitoring unit via a Wi-Fi communication channel, and the hub RF transceiver unit to communicate with the dual-mode monitoring unit RF transceiver of each of the remaining dual-mode monitoring units via the RF communication channels. In this way, it is possible to use as many RF communication channels as possible to save battery time of the monitoring units, and to increase the range between the hub and the monitoring units.

In one embodiment, the system may further comprise a receiving unit which comprises a receiving unit RF transceiver; the hub RF transceiver unit communicates with the receiving unit RF transceiver via a receiving unit RF communication channel.

In one embodiment, the system may further comprise at least one RF monitoring unit, each of which comprises a RF monitoring unit RF transceiver; the hub RF transceiver unit communicates with the RF monitoring unit RF transceiver via a RF monitoring unit RF communication channel.

In one embodiment, the hub RF transceiver unit may comprise more than one RF transceiver. For example, the hub RF transceiver unit may comprise two 2.4 GHz RF transceivers.

In one embodiment, the hub connects to the Wi-Fi router via a RJ 45 cable or via Wi-Fi. If the hub connects to the Wi-Fi router via a RJ 45 cable, system set-up via RF link is easy without pairing or any setup and requires simply plug and play.

In one embodiment, each of the at least one dual-mode monitoring unit and each of the at least one RF monitoring unit further comprises a motion detection sensing unit and a temperature sensing unit; the motion detection sensing unit is configured to detect movement and to activate the temperature sensing unit if movement is detected; the temperature sensing unit is configured to, upon activation, detect presence of a heat generating object (e.g. human, cat, dog, car, etc.) and to activate recording function of the monitoring unit if presence of a heat generating object is detected. This has the advantage of reducing false trigger due to temperature change which is common in normal IR sensor, and reducing false trigger in motion detection due to movement of trees and change of sunlight. With the present invention, battery life could be greatly reduced in battery cam application, because false triggers which cause the battery cam (the monitoring unit) to activate video recording and transmit signals to the hub are greatly reduced.

In one embodiment, the dual-mode monitoring unit RF transceiver is built in the dual-mode monitoring unit or connected to the dual-mode monitoring unit in form of a USB dongle; the receiving unit RF transceiver is built in the receiving unit or connected to the receiving unit in form of a USB dongle; the RF monitoring unit RF transceiver is built in the RF monitoring unit or connected to the RF monitoring unit in form of a USB dongle; each of the RF transceivers of the hub RF transceiver unit is built in the hub or connected to the hub in form of a USB dongle.

DETAILED DESCRIPTION OF THE INVENTION

The present invention is described further in detail below with reference to a preferred embodiment and the accompanying drawings. It should be understood that the present invention should not be limited to the embodiment described herein.

Figure 1:
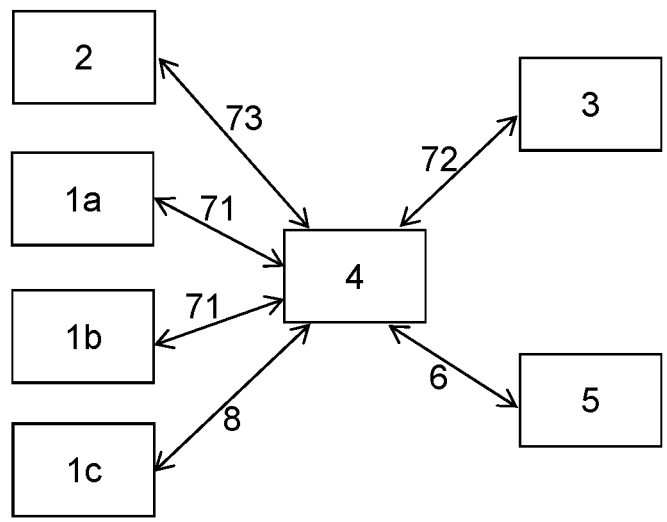
FIG. 1 is a schematic diagram of a preferred embodiment of the present invention.
Figure 2:
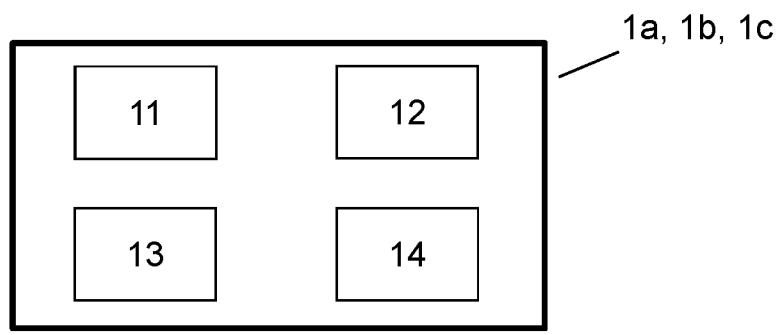
FIG. 2 is a schematic diagram of the dual-mode monitoring unit of the preferred embodiment of the present invention.
Figure 3:
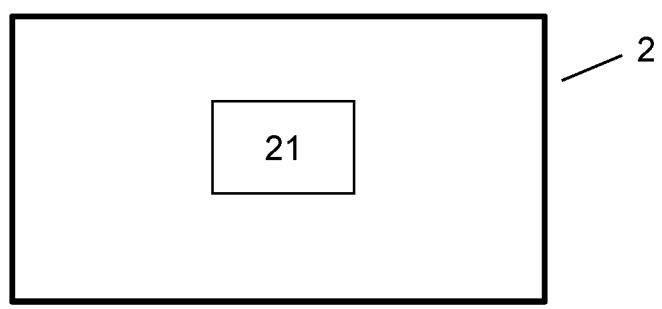
FIG. 3 is a schematic diagram of the RF monitoring unit of the preferred embodiment of the present invention.
Figure 4:
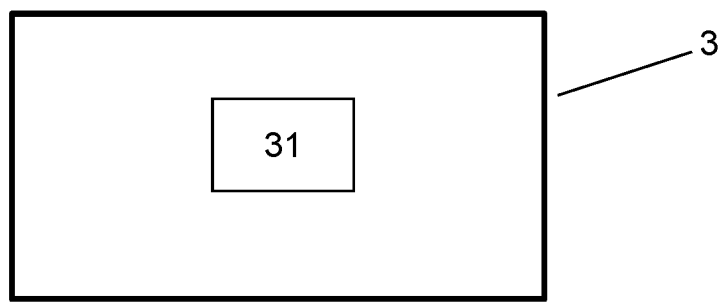
FIG. 4 is a schematic diagram of the receiving unit of the preferred embodiment of the present invention.
Figure 5:
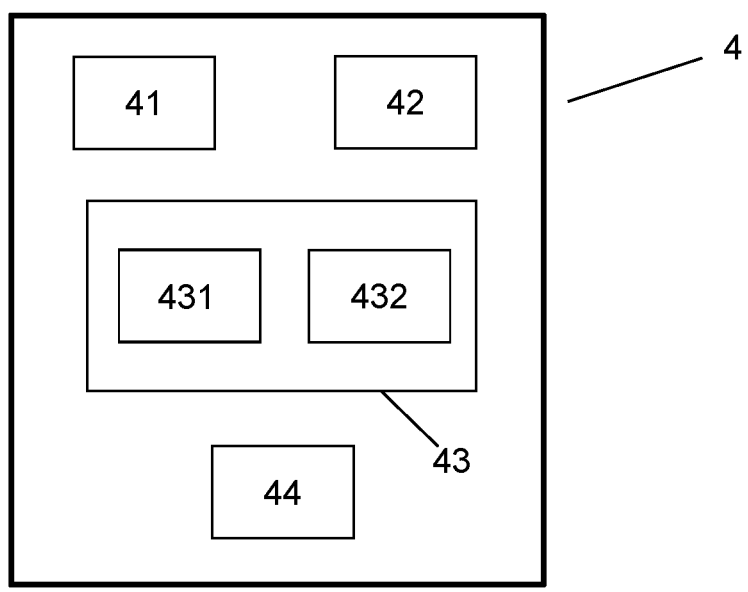
FIG. 5 is a schematic diagram of the hub of the preferred embodiment of the present invention.

As illustrated in FIGS. 1-5, a preferred embodiment of the scalable dual mode monitoring system of the present invention comprises three dual-mode monitoring units 1a, 1b, 1c, one RF monitoring unit 2, a receiving unit 3 and a hub 4. Each of the dual-mode monitoring units 1a, 1b, 1c comprises a dual-mode monitoring unit RF transceiver 11 and a dual-mode monitoring unit Wi-Fi transceiver 12. The dual-mode monitoring unit RF transceiver 11 is built in the dual-mode monitoring unit 1a, 1b, 1c or connected to the dual-mode monitoring unit 1a, 1b, 1c in form of a USB dongle. The RF monitoring unit 2 comprises a RF monitoring unit RF transceiver 21. The RF monitoring unit RF transceiver 21 is built in the RF monitoring unit 2 or connected to the RF monitoring unit 2 in form of a USB dongle. The receiving unit 3 comprises a receiving unit RF transceiver 31. The receiving unit RF transceiver 31 is built in the receiving unit 3 or connected to the receiving unit 3 in form of a USB dongle. The hub 4 connects to a Wi-Fi router 5 via a RJ45 cable 6 in this embodiment and comprises one or more processors 41, a hub Wi-Fi transceiver 42 and a hub RF transceiver unit 43 which provides a plurality of RF communication channels 71 for communicating between the hub RF transceiver unit 43 and the dual-mode monitoring unit RF transceivers 11 of the dual-mode monitoring units 1a, 1b, 1c. The hub RF transceiver unit 43 communicates with the receiving unit RF transceiver 31 via a receiving unit RF communication channel 72. The hub RF transceiver unit 43 communicates with the RF monitoring unit RF transceiver 21 via a RF monitoring unit RF communication channel 73.

In this embodiment, the hub RF transceiver unit 43 comprises two 2.4 GHz RF transceivers 431, 432. Each of the RF transceivers 431, 432 of the hub RF transceiver unit 43 is built in the hub 4 or connected to the hub 4 in form of a USB dongle. Each of the two 2.4 GHz RF transceivers 431, 432 can support up to one 1080p camera or two 720p cameras. In this embodiment, the dual-mode monitoring units 1a, 1b, 1c and the RF monitoring unit 2 are all 720p cameras. In other words, the hub RF transceiver unit 43 could support simultaneous RF communications with the receiving unit 3 via the receiving unit RF communication channel 72, the RF monitoring unit 2 via the RF monitoring unit RF communication channel 73, and two of the dual-mode monitoring units 1a, 1b, 1c via the RF communication channels 71. Therefore, if only the RF monitoring unit 2 and two dual-mode monitoring units 1a, 1b need to communicate with the receiving unit 3, the hub 4 configures the hub RF transceiver unit 43 to communicate with the dual-mode monitoring unit RF transceiver 11 of each of the two dual-mode monitoring units 1a, 1b via the RF communication channels 71.

However, when an additional dual-mode monitoring unit 1c is required to establish communication with the hub 4, instructions executed by one or more processors 41 stored in memory 44 of the hub 4 cause the hub 4 to determine if all the RF communication channels 71 are occupied. At this time, as all the RF communication channels 71 have been used up by the two dual-mode monitoring units 1a, 1b, no further RF communication channel 71 is available. Therefore, the hub 4 then selects, among the two dual-mode monitoring units 1a, 1b which are in communication with the hub 4 and the dual-mode monitoring unit 1c which is required to establish communication with the hub 4, a dual-mode monitoring unit which is within a particular range possible for communication between the dual-mode monitoring unit Wi-Fi transceiver thereof and the hub Wi-Fi transceiver 42. In this embodiment, the dual-mode monitoring unit 1c is located within the particular range possible for Wi-Fi communication, so the dual-mode monitoring unit 1c is selected; and the hub 4 then configures the hub Wi-Fi transceiver 42 to communicate with the dual-mode monitoring unit Wi-Fi transceiver 12 of the selected dual-mode monitoring unit 1c via a Wi-Fi communication channel 8, and the hub RF transceiver unit 43 to communicate with the dual-mode monitoring unit RF transceiver 11 of each of the remaining dual-mode monitoring units 1a, 1b via the RF communication channels 71. In another exemplary embodiment not shown in the figures, the dual-mode monitoring unit 1a instead of the dual-mode monitoring unit 1c is located within the particular range possible for Wi-Fi communication, so in this case the dual-mode monitoring unit 1a is selected; and the hub 4 then configures the hub Wi-Fi transceiver 42 to communicate with the dual-mode monitoring unit Wi-Fi transceiver 12 of the selected dual-mode monitoring unit 1a via a Wi-Fi communication channel 8, thereby releasing the RF communication channel 71 originally communicating with the dual-mode monitoring unit RF transceiver 11 of the dual-mode monitoring unit 1a so that the hub 4 could then configure the hub RF transceiver unit 43 to communicate with the dual-mode monitoring unit RF transceiver 11 of the dual-mode monitoring unit 1c via the released RF communication channel 71.

In this embodiment, the RF communication channels 71, the receiving unit RF communication channel 72 and the RF monitoring unit RF communication channel 73 are 2.4 GHz FHSS RF communication channels.

In this embodiment, each of the dual-mode monitoring units 1a, 1b, 1c further comprises a motion detection sensing unit 13 and a temperature sensing unit 14; the motion detection sensing unit 13 is configured to detect movement and to activate the temperature sensing unit 14 if movement is detected; the temperature sensing unit 14 is configured to, upon activation, detect presence of a heat generating object (e.g. human, cat, dog, car, etc.) and to activate recording function of the dual-mode monitoring units 1a, 1b, 1c if presence of a heat generating object is detected. In this way, it is possible to reduce the false alarm created by sunlight, tree movement or far objects that are not of interest to the dual-mode monitoring units 1a, 1b, 1c.

It should be noted that the dual-mode monitoring unit RF transceiver 11, the RF monitoring unit RF transceiver 21, the receiving unit RF transceiver 31, as well as the RF transceivers 431, 432 of the hub RF transceiver unit 43 in the embodiment described above are basically transceivers having basically same structure and functions. The embodiment described above is a preferred embodiment of the present invention. It is understood that the present invention should not be limited to the embodiment as described. Any changes, modifications, replacements, combinations and simplification without deviating from the essence and principle of the present invention should be considered alternative configurations that are equally effective and should also fall within the scope of protection of the present invention.

What is claimed is:

1. A scalable dual mode monitoring system comprising:
   at least one dual-mode monitoring unit which comprises a dual-mode monitoring unit RF transceiver and a dual-mode monitoring unit Wi-Fi transceiver;
   a hub which connects to a Wi-Fi router and comprises one or more processors, a hub Wi-Fi transceiver and a hub RF transceiver unit which provides a plurality of RF communication channels for communicating between the hub RF transceiver unit and the dual-mode monitoring unit RF transceiver of the at least one dual-mode monitoring unit;
   the hub further comprises memory storing instructions that, when executed by the one or more processors when communication between the hub and any one of the at least one dual-mode monitoring unit is required to be established, cause the hub to:
   determine if all the RF communication channels are occupied;
   if not all the RF communication channels are occupied, configure the hub RF transceiver unit to communicate with the dual-mode monitoring unit RF transceiver of the at least one dual-mode monitoring unit which is required to establish communication with the hub via one of the RF communication channels;
   if all the RF communication channels are occupied, configure the hub to select, among the dual-mode monitoring unit(s) which is/are in communication with the hub RF transceiver unit and the dual-mode monitoring unit which is required to establish communication with the hub, a dual-mode monitoring unit which is within a particular range possible for communication between the dual-mode monitoring unit Wi-Fi transceiver thereof and the hub Wi-FI transceiver; and then configure the hub Wi-Fi transceiver to communicate with the dual-mode monitoring unit Wi-Fi transceiver of the selected dual-mode monitoring unit via a Wi-Fi communication channel, and the hub RF transceiver unit to communicate with the dual-mode monitoring unit RF transceiver of each of remaining dual-mode monitoring units via the RF communication channels.

2. The scalable dual mode monitoring system as in claim 1, wherein the system further comprises a receiving unit which comprises a receiving unit RF transceiver; the hub RF transceiver unit communicates with the receiving unit RF transceiver via a receiving unit RF communication channel.

3. The scalable dual mode monitoring system as in claim 2, wherein the receiving unit RF transceiver is built in the receiving unit or connected to the receiving unit in form of a USB dongle.

4. The scalable dual mode monitoring system as in claim 1, wherein the system further comprises at least one RF monitoring unit, each of which comprises a RF monitoring unit RF transceiver; the hub RF transceiver unit communicates with the RF monitoring unit RF transceiver via a RF monitoring unit RF communication channel.

5. The scalable dual mode monitoring system as in claim 4, wherein each of the at least one RF monitoring unit further comprises a motion detection sensing unit and a temperature sensing unit; the motion detection sensing unit is configured to detect movement and to activate the temperature sensing unit if movement is detected; the temperature sensing unit is configured to, upon activation, detect presence of a heat generating object and to activate recording function of the monitoring unit if presence of a heat generating object is detected.

6. The scalable dual mode monitoring system as in claim 4, wherein the RF monitoring unit RF transceiver is built in the RF monitoring unit or connected to the RF monitoring unit in form of a USB dongle.

7. The scalable dual mode monitoring system as in claim 1, wherein the hub RF transceiver unit comprises more than one RF transceiver.

8. The scalable dual mode monitoring system as in claim 7, wherein each of the RF transceivers of the hub RF transceiver unit is built in the hub or connected to the hub in form of a USB dongle.

9. The scalable dual mode monitoring system as in claim 1, wherein the hub connects to the Wi-Fi router via a RJ 45 cable or via WI-Fi.

10. The scalable dual mode monitoring system as in claim 1, wherein each of the at least one dual-mode monitoring unit further comprises a motion detection sensing unit and a temperature sensing unit; the motion detection sensing unit is configured to detect movement and to activate the temperature sensing unit if movement is detected; the temperature sensing unit is configured to, upon activation, detect presence of a heat generating object and to activate recording function of the monitoring unit if presence of a heat generating object is detected.

11. The scalable dual mode monitoring system as in claim 1, wherein the dual-mode monitoring unit RF transceiver is built in the dual-mode monitoring unit or connected to the dual-mode monitoring unit in form of a USB dongle.

* * * * *